April 13, 1937.  H. F. LEWIS  2,076,736
ARTICLE ASSEMBLING CONVEYER MECHANISM
Filed July 26, 1935
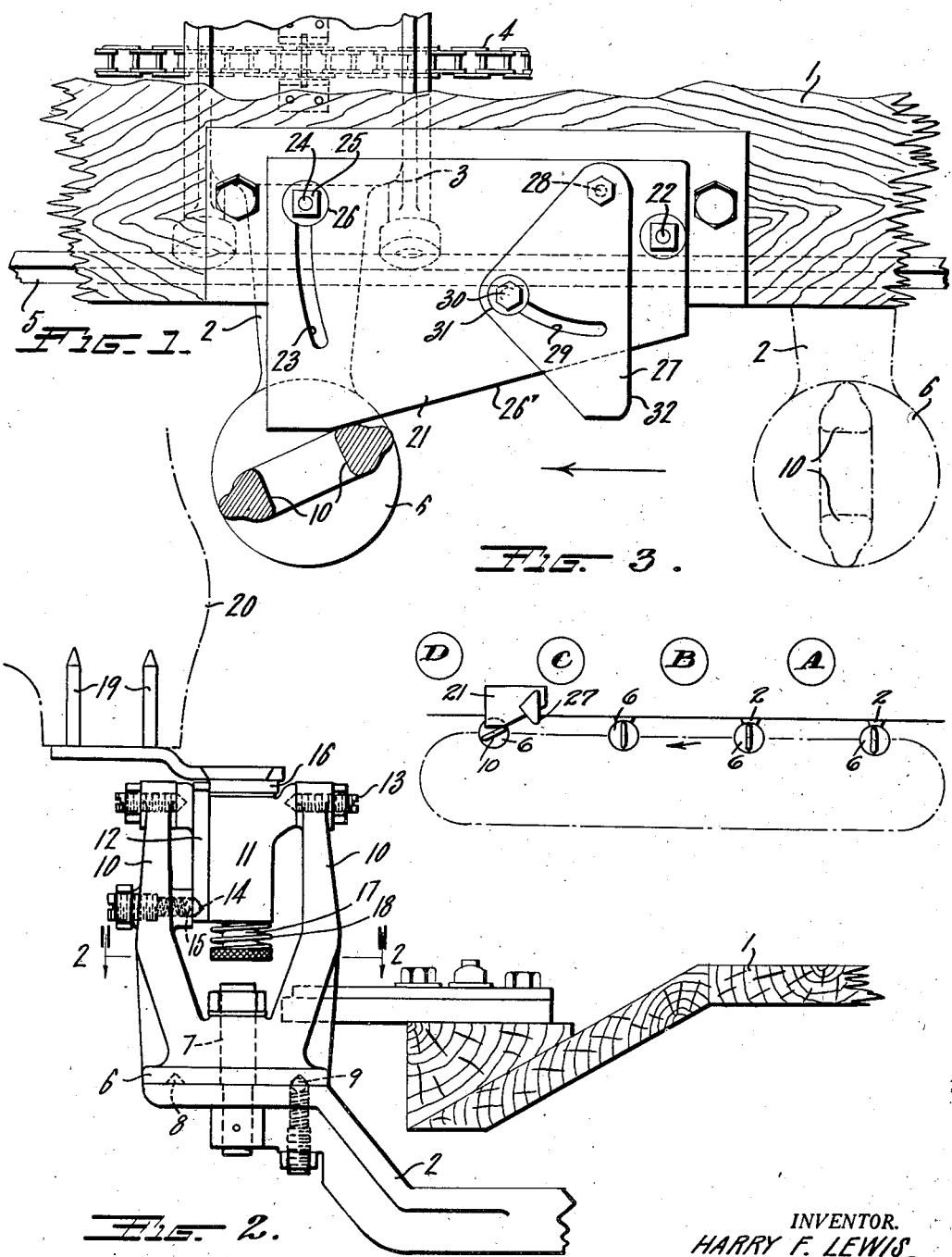
INVENTOR.
HARRY F. LEWIS
BY
ATTORNEY Patented Apr. 13, 1937

2,076,736

UNITED STATES PATENT OFFICE 2,076,736

ARTICLE ASSEMBLING CONVEYER MECHANISM

Harry F. Lewis, Hamden, Conn., assignor to United States Rubber Products, Inc., New York, N. Y., a corporation of Delaware Application July 26, 1935, Serial No. 33,234

10 Claims. (Cl. 12—1)

This invention relates to an article assembling conveyer mechanism, and more particularly to an automatic lasting jack turning device for footwear assembling conveyers.

In the making of rubber footwear the practice for many years was for an individual operator to completely assemble a footwear article on a last, performing all operations up to the completion of the article. More recently rubber footwear has been assembled on conveyers, the conveyers carrying a series of spaced lasting jacks supporting the lasts on which the articles are to be assembled, and the operators being stationed along the conveyer at suitable intervals with each operator carrying out a predetermined portion of the assembling operation. It is obvious that with such a method of assembling footwear, the longest time required by an operator at any one station determines the speed of the entire assembling operation, and the time at a station is measured in seconds. Therefore, even the smallest saving in time at the stations is of value for speeding up the operation of the conveyer as a whole.

For convenience in assembling, it is necessary that the footwear last on the jack be presented in different positions at the different stations, or that it be turned by the operator at any station during the carrying out of his assigned assembling operation, and in order to permit this it is customary to use adjustable lasting jacks so that the lasts may be turned as desired. Obviously, after an operator has completed his assigned duty at one station, the operator at the next station may require that the jack be in a different position, and one or the other of the two operators must manually turn the jack. Also, it is now common to perform certain of the operations at given stations, such as pressing or rolling, by automatic machinery, which machinery requires that the last be presented to it in a definite position, and therefore, it has been necessary for the operator at a station preceding that at which the automatic machinery is located to see that the last leaving his station is in proper position to pass to the automatic machine. It may even be the case that operations at two succeeding stations are both carried out by automatic machinery, and that these machines require the last to be presented in different positions, and in such case it is necessary that an operator be stationed to properly present the last. These turning operations to position the last for a succeeding operation require an extra manual operation which slows down the speed of the conveyer.

An object of my invention is to speed up footwear conveyers in operation.

Another object is to provide an automatic last turning device for footwear assembling conveyers.

Another object is to provide a safety device in case of jamming of parts to be turned.

Other objects will appear from the detailed description and drawing, in which latter:

Figure 1 is a broken away plan view of a footwear assembling conveyer illustrating the automatic last jack turning device;

Figure 2 is a side elevation partly in section illustrating the device; and

Figure 3 is a diagrammatic sketch showing the conveyer stations and path of the last supports.

Referring to the drawing there is shown in Fig. 1 a portion of a conveyer table designated by the numeral 1. Movable along the edge of the table are a series of suitably spaced last jack supporting arms 2 which extend beneath the table, and each jack supporting arm is connected to a carriage 3, a part only of which is shown, the carriage being driven by the conveyer chain 4 and running on rails 5, but one of which is shown. The specific form of conveyer mechanism forms no part of the invention, and any suitable form of conveyer may be used, such as that shown in patent to Patten No. 1,953,256, issued April 3, 1934. In order to illustrate the invention on a large scale, but one of the last jack supporting arms is shown.

Attached to each last jack supporting arm 2 is an adjustable lasting jack, which may be of any suitable type, such as that shown in patent to Patten No. 1,498,400, issued June 17, 1924. The jack comprises a base 6 which is rotatably mounted on the supporting arm by the pivot pin 7, and in order to hold the jack in rotatably adjusted position, the lower side of the base is provided with recesses 8 adapted to be engaged by the spring pressed ball detent 9. The base is usually provided with four recesses 8 spaced 90° apart, so that when the base is rotated, the ball detent may yieldingly hold it in positions 90° apart, that is, any adjusted position is at right angles to the immediately preceding one. Extending upwardly from the base of the jack are yoke arms 10, and a pivot member 11 carrying a quadrant 12 is pivotally supported at 13 in the arms 10. The quadrant 12 is provided with a series of recesses 14 adapted to be engaged by the spring pressed ball detent 15 carried in one of the arms 10, so that the pivot member 11 may be yieldingly held in a number of different angular positions. A last pin support 16 is rotatably mounted in the pivot member 11 on a pin 17, and is frictionally held against rotation by the coil spring 18. The last pin support carries the last pins 19 upon which the last 20 is mounted.

The last jack turning device comprises a cam plate 21 which is pivotally mounted on the table 1 by the pivot bolt 22, and the plate 21 has formed therein a slot 23 curved on an arc whose center is the pivot pin 22. A bolt 24 passes through the slot 23, and by means of the nut 25 and washer 26 the plate 21 is frictionally held in adjusted position. The cam plate 21 is provided with an inclined cam edge 26', this edge projecting sufficiently far out from the table to be engaged by a lasting jack in a manner to be later described.

A bumper plate 27 is pivotally mounted on the plate 21 by the bolt 28, and the plate 27 is also provided with a slot 29 which is curved on an arc whose center is the pivot bolt 28. The plate 27 is frictionally held in adjusted position by a screw 30, and a washer 31, the screw passing through the slot 29 and being secured in the plate 21. The plate 27 is provided with a bumper edge 32 which in the position shown in Fig. 1 is directed at substantially a right angle to the path of the moving jacks, and which edge extends far enough out from the table to contact a jack, but it does not extend out quite as far as the cam plate 21, for a reason to be later described.

In operation, as a jack, the aligned arms of which are disposed at right angles to the table as shown in dot and dash lines in Fig. 1, is moved along in its path by the conveyer, one of its arms 10 contacts with the edge 32 of the bumper plate 27 and as a consequence the jack is turned on its pivot pin 7. However, before the jack has been turned 90°, the projecting end of the bumper plate 27 will pass around the contacting edge of the jack and the jack will then move on and come into contact with the inclined cam edge 26' of the plate 21, which edge will continue the rotation of the jack until it is disposed in a position at right angles to the position at which it first contacted the plate 27.

The conveyer is operated at a relatively slow speed, say about 16 feet per minute. The contact of the jacks with the turning device is therefore not a jarring or striking one but a slow, pushing one, and the turning of the jacks is accomplished without any tendency to break them. By reason of the adjustability of plates 21 and 27 they can be set to most efficiently turn the jacks, the angle of plate 27 to the path of the jacks always being greater, however, than the angle of plate 21. The plate 27 may be adjusted to just start rotation of a jack or it may be set to turn it to a much greater degree, as shown in Fig. 1. If the plate 27 were used alone it might turn the jack so rapidly that the lasted shoe might be displaced, as due to wear and tear the engagement of last pins 19 in holes of last 20 is usually rather loose.

In addition to acting as a jack turning device, the bumper plate 27 and cam plate 21 act as safety devices in case for any reason the jack is jammed on its support and fails to turn. In order to function in this manner the bolt 24 securing the plate 21 and the screw 30 securing the plate 27 are tightened just sufficiently so that their washers will frictionally hold the plates in proper position during ordinary operation. However, if for any reason the jack approaching them jams, the bolt 24 and screw 30 are not tightened enough to hold the plates 21 and 27 when an unusualy pressure is brought against them, and as a result the plate 27 can swing on its pivot bolt 28 and the plate 21 swung on its pivot bolt 22, thus avoiding breakage of the jack or the turning device.

It will be seen that by the invention the operation of turning the lasting jack through an angle of 90° is performed entirely automatically. Obviously other forms of adjustable lasting jack may be employed and in such case the contacting portion of the jack will be suitably shaped to be operated by the plates 27 and 21.

By the use of the turning device, an operator is therefore freed from the necessity of turning the lasting jack with a consequent saving in time which may be utilized for other purposes. Also, in the case where an automatic machine is disposed at any station along the conveyer, the device of the present invention may be used either in advance of it to turn a jack to a desired position before reaching the machine, or the device may be disposed in rear of the automatic machine to turn a jack to a proper position for a succeeding operator or a succeeding machine.

The device is, of course, applicable to other assembling conveyers where an article is assembled on an adjustable support.

While a specific embodiment of the invention has been shown and described, it is obvious that modifications may be made therein and it is not desired to limit the invention otherwise than as is required by the prior art, and the scope of the appended claims.

Having thus described my invention, what I claim and desire to protect by Letters Patent is:

1. In an article assembling conveyer provided with spaced assembling stations, a series of rotatable article supports movable in a continuous and fixed path by the conveyer, and closely spaced successive normally fixed members in said continuous fixed path of said supports and between two adjacent assembling stations for imparting successive movements of partial rotation to a support engaging them.

2. In an article assembling conveyer, a series of article supports rotatable on a vertical axis and movable by the conveyer, each support being provided with detents for yieldingly holding it in a plurality of rotated positions, and normally fixed members successively engageable by a support for rotating it by separate successive movements from one detent position to a succeeding one.

3. In a footwear making conveyer, a series of rotatable lasting jacks movable by the conveyer, a bumper plate disposed partly in the path of said jacks and having a jack contacting edge disposed at a larger angle to said path, and a succeeding cam plate projecting further into the path of said jacks and having an outwardly directed jack contacting edge inclined at a less angle to said path.

4. In a footwear making conveyer, a series of spaced and step-by-step-rotatable lasting jacks movable by the conveyer, successive members disposed in the path of said jacks for conjointly imparting a single step of rotation to each jack, and frictionally operating holding means for said members, whereby said members may be displaced upon undue pressure against them by a jack.

5. In an article assembling conveyer, a series of footwear lasting jacks rotatable on a vertical axis and movable by the conveyer, each jack being provided with detents for yieldingly holding it in a plurality of rotated positions, a normally fixed member projecting sufficiently into the path of a jack to engage and partially rotate it from one detent to a succeeding one, and a second normally fixed member projecting further into the path of said jack and adapted to completely rotate it to said succeeding detent.

6. In a footwear making conveyer, a series of step-by-step-rotatable lasting jacks movable by the conveyer, a contact member having a contact edge partially projecting into the path of said jacks and at a larger angle to said path, and a second contact member having a contact edge projecting further into the path of said jacks and inclined at a less angle to said path.

7. In a footwear making conveyer, a rotatable lasting jack movable by the conveyer and having a narrowed supporting portion, a bumper plate having an edge disposed at a larger angle to the path of said jack and in position to be contacted by an end of said narrowed portion of the jack, and a succeeding cam plate having an edge inclined at a less angle to the path of said jack and in position to be contacted by said end after partial rotation of the jack by the bumper plate.

8. In a footwear making conveyer, a series of rotatable lasting jacks movable by the conveyer, and a jack turning device disposed in the path of said jacks, said device comprising a pivotally mounted cam plate having a slightly inclined cam edge disposed in the path of a jack, means for frictionally holding said plate in position, a bumper plate pivotally mounted on said cam plate and having an edge at a larger angle to the path of said jacks, said edge projecting into said path a less distance than said inclined edge, and means for frictionally holding said bumper plate in position.

9. In a footwear making conveyer, a series of rotatable lasting jacks movable in a path by the conveyer, and a jack turning device disposed in said path, said device comprising a pivot-mounted cam plate having a cam edge disposed in said path and at a relatively small angle thereto, an arcuate slot in the plate concentric with said pivot, means extending through said slot for frictionally holding said plate, a pivot-mounted bumper plate carried by the cam plate and having an edge disposed in and at a larger angle to said path, said edge projecting to a less distance in said path than said inclined edge, an arcuate slot in said bumper plate concentric with its pivot, and means extending through said last slot for frictionally holding the bumper plate in position.

10. In a footwear making conveyer, a series of step-by-step-rotatable lasting jacks movable in a path by the conveyer, each jack having a narrowed contact portion capable of being disposed at right angles or parallel to said path, a bumper plate having an edge at a relatively large angle to said path and projecting sufficiently into said path to contact with an end of said narrowed contact portion of a jack when said contact portion is at right angles to said path and thereby rotate the jack a part of a single step, and a succeeding cam plate having a contact edge inclined at a less angle and projecting into the path of said end of the partially rotated jack to complete the step of rotation upon contact with said end.

HARRY F. LEWIS.